US012625733B2

(12) United States Patent
Jain et al.

(10) Patent No.: US 12,625,733 B2
(45) Date of Patent: May 12, 2026

(54) DYNAMIC DECENTRALIZED RESOURCES MANAGER

(71) Applicant: International Business Machines Corporation, Armonk, NY (US)

(72) Inventors: Abhishek Jain, Baraut (IN); Vivek Venkatanarasaiah, Bangalore (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 18/470,068

(22) Filed: Sep. 19, 2023

(65) Prior Publication Data

US 2025/0094229 A1 Mar. 20, 2025

(51) Int. Cl.
*G06F 9/50* (2006.01)

(52) U.S. Cl.
CPC .................................. *G06F 9/5033* (2013.01)

(58) Field of Classification Search
CPC ................................................... G06F 9/5033
USPC ........................................................ 718/104
See application file for complete search history.

(56) References Cited

U.S. PATENT DOCUMENTS

| | | | | |
|---|---|---|---|---|
| 7,668,177 B1 * | 2/2010 | Trapp | .................. | H04L 47/2475 370/395.42 |
| 10,013,283 B1 * | 7/2018 | Connolly | ............ | G06F 12/0888 |

| | | | | |
|---|---|---|---|---|
| 11,775,861 B1 * | 10/2023 | Rajani | ..................... | H04L 51/52 706/12 |
| 2013/0123964 A1 * | 5/2013 | Cooper | ................... | G06F 3/067 700/97 |
| 2014/0173113 A1 * | 6/2014 | Vemuri | ............... | H04L 41/5022 709/226 |
| 2015/0006677 A1 * | 1/2015 | Mahajan | ................. | H04L 67/02 709/219 |
| 2015/0257161 A1 * | 9/2015 | Hsu | ........................ | H04W 48/02 455/453 |
| 2015/0378743 A1 * | 12/2015 | Zellermayer | ....... | G06F 9/45558 713/2 |
| 2018/0107479 A1 * | 4/2018 | Duppenthaler | ........... | G06F 8/71 |
| 2020/0267212 A1 | 8/2020 | Chatt et al. | | |
| 2020/0296055 A1 * | 9/2020 | Salim | ..................... | H04L 47/783 |
| 2020/0409668 A1 * | 12/2020 | Eberlein | ................... | G06F 8/35 |
| 2021/0034423 A1 | 2/2021 | Hallur et al. | | |
| 2021/0279187 A1 * | 9/2021 | Puder | .................. | G06F 13/1668 |
| 2021/0329496 A1 | 10/2021 | Koodli | | |
| 2022/0405131 A1 | 12/2022 | Yao et al. | | |
| 2024/0069758 A1 * | 2/2024 | Groves | ................. | G06F 3/0625 |

* cited by examiner

*Primary Examiner* — Adam Lee
(74) *Attorney, Agent, or Firm* — Yee & Associates, P.C.

(57) ABSTRACT

A computer implemented method is provided. A number of processor units identify a number of candidate applications for processing requests based on types of application programming interface for each application. The number of processor units validate metadata related to status of applications for each application in the number of candidate applications. The number of processor units select a subgroup of applications from the number of candidate applications to process requests based on the validated metadata.

18 Claims, 9 Drawing Sheets

COMPUTING ENVIRONMENT
100

224

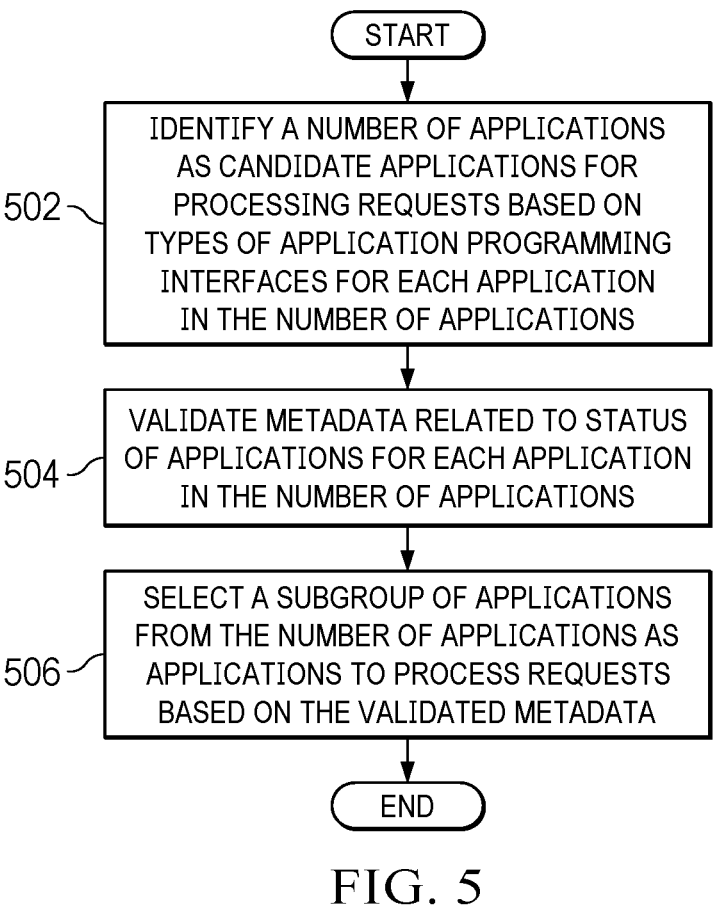

START

502 ~ IDENTIFY A NUMBER OF APPLICATIONS
AS CANDIDATE APPLICATIONS FOR
PROCESSING REQUESTS BASED ON
TYPES OF APPLICATION PROGRAMMING
INTERFACES FOR EACH APPLICATION
IN THE NUMBER OF APPLICATIONS

504 ~ VALIDATE METADATA RELATED TO STATUS
OF APPLICATIONS FOR EACH APPLICATION
IN THE NUMBER OF APPLICATIONS

506 ~ SELECT A SUBGROUP OF APPLICATIONS
FROM THE NUMBER OF APPLICATIONS AS
APPLICATIONS TO PROCESS REQUESTS
BASED ON THE VALIDATED METADATA

END

FIG. 5

602 — GENERATE A RANKED LIST OF APPLICATIONS FOR PROCESSING REQUESTS BASED ON THE SUBGROUP OF APPLICATIONS

604 — RECEIVE A REQUEST TO RETRIEVE INFORMATION

606 — IDENTIFY TOP APPLICATION FROM THE RANKED LIST OF APPLICATIONS TO RETRIEVE INFORMATION BASED ON CONTEXT OF THE REQUEST

608 — RETURN THE IDENTIFIED APPLICATION, REQUESTED INFORMATION

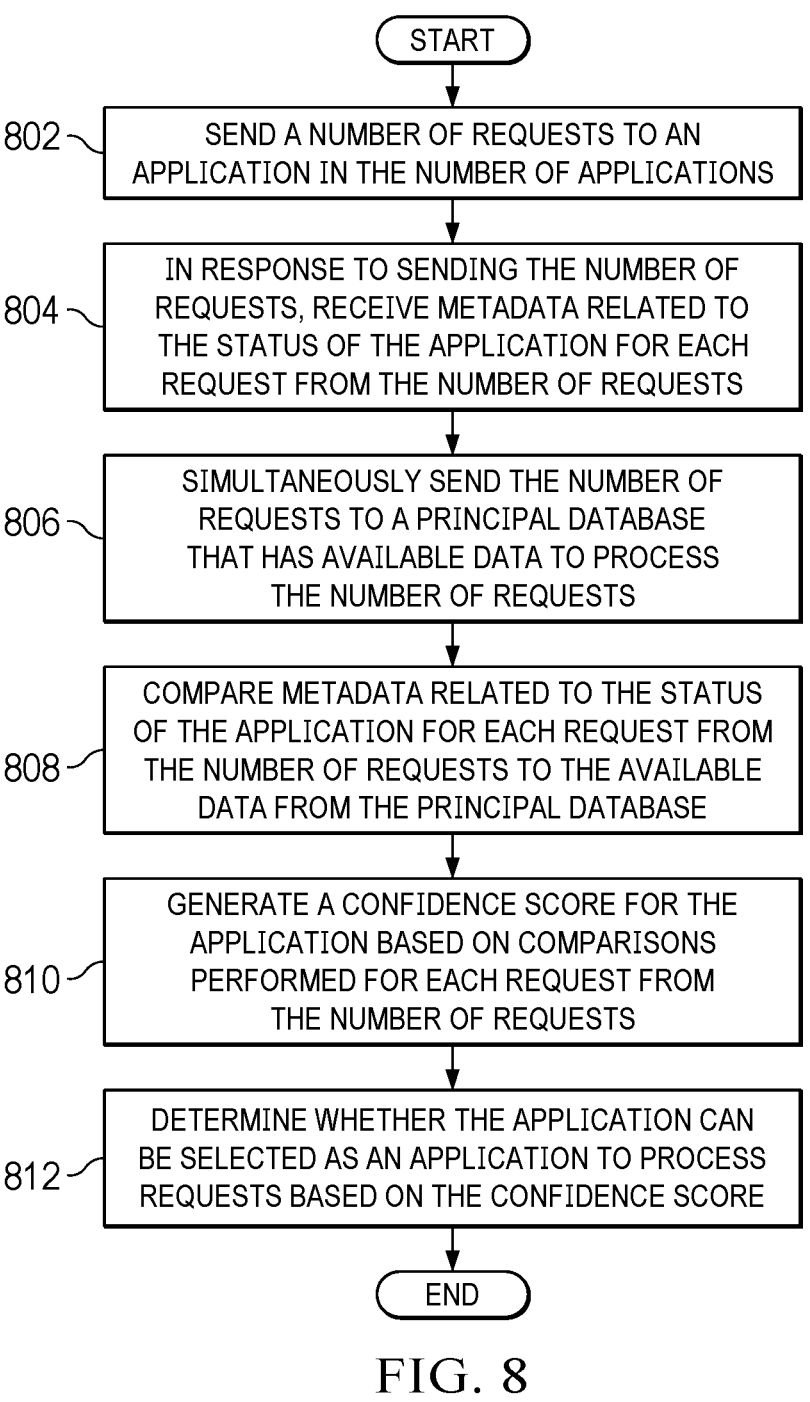

START

802 — SEND A NUMBER OF REQUESTS TO AN APPLICATION IN THE NUMBER OF APPLICATIONS

804 — IN RESPONSE TO SENDING THE NUMBER OF REQUESTS, RECEIVE METADATA RELATED TO THE STATUS OF THE APPLICATION FOR EACH REQUEST FROM THE NUMBER OF REQUESTS

806 — SIMULTANEOUSLY SEND THE NUMBER OF REQUESTS TO A PRINCIPAL DATABASE THAT HAS AVAILABLE DATA TO PROCESS THE NUMBER OF REQUESTS

808 — COMPARE METADATA RELATED TO THE STATUS OF THE APPLICATION FOR EACH REQUEST FROM THE NUMBER OF REQUESTS TO THE AVAILABLE DATA FROM THE PRINCIPAL DATABASE

810 — GENERATE A CONFIDENCE SCORE FOR THE APPLICATION BASED ON COMPARISONS PERFORMED FOR EACH REQUEST FROM THE NUMBER OF REQUESTS

812 — DETERMINE WHETHER THE APPLICATION CAN BE SELECTED AS AN APPLICATION TO PROCESS REQUESTS BASED ON THE CONFIDENCE SCORE

END

FIG. 8

DYNAMIC DECENTRALIZED RESOURCES MANAGER

BACKGROUND

The disclosure relates generally to an improved computer system and more specifically to a computer implemented method, apparatus, system, and computer program product for identifying applications for processing requests as sources of truth.

Kubernetes environment is an open-source container orchestration environment for automating software deployment, software scaling, and software management. The Kubernetes environment includes a control plane and set of worker nodes. The control plane in Kubernetes environment is responsible for maintaining the status and health of all the resources in Kubernetes environment. As a result, the control plane can make decisions related to scheduling, scaling and more. The control plane in Kubernetes environment includes a number of components. The control plane includes controllers that continuously monitor the state of Kubernetes environment and work to maintain the state in line with desired threshold. Kubernetes environment also includes a key value database that is responsible for storing the state of the resources for Kubernetes environment. In this case, requests for deployment and scaling will be forwarded to the control plane so that the control plane can decide whether the requests can be processed based on available resources from the key value database. For example, when an external system makes a request to create or update a resource, the controllers are triggered so that the requested resources are created, scaled, or updated with available resources from the key value database to achieve the desired state for the Kubernetes environment.

SUMMARY

According to one illustrative embodiment, a computer implemented method for selecting applications for processing requests is provided. A number of processor units identify a number of candidate applications for processing requests based on types of application programming interfaces for each application in the number of applications. The number of processor units validate metadata related to status of applications for each application in the number of candidate applications. The number of processor units select a subgroup of applications from the number of candidate applications to process requests based on the validated metadata. According to other illustrative embodiments, a computer system and a computer program product for predicting the next frame are provided.

BRIEF DESCRIPTION OF THE DRAWINGS

FIG. 5 is a flowchart of a process for identifying applications for processing requests in accordance with an illustrative embodiment;

FIG. 8 is a flowchart of a process for validating applications for processing requests in accordance with an illustrative embodiment.

DETAILED DESCRIPTION

Figure 1:
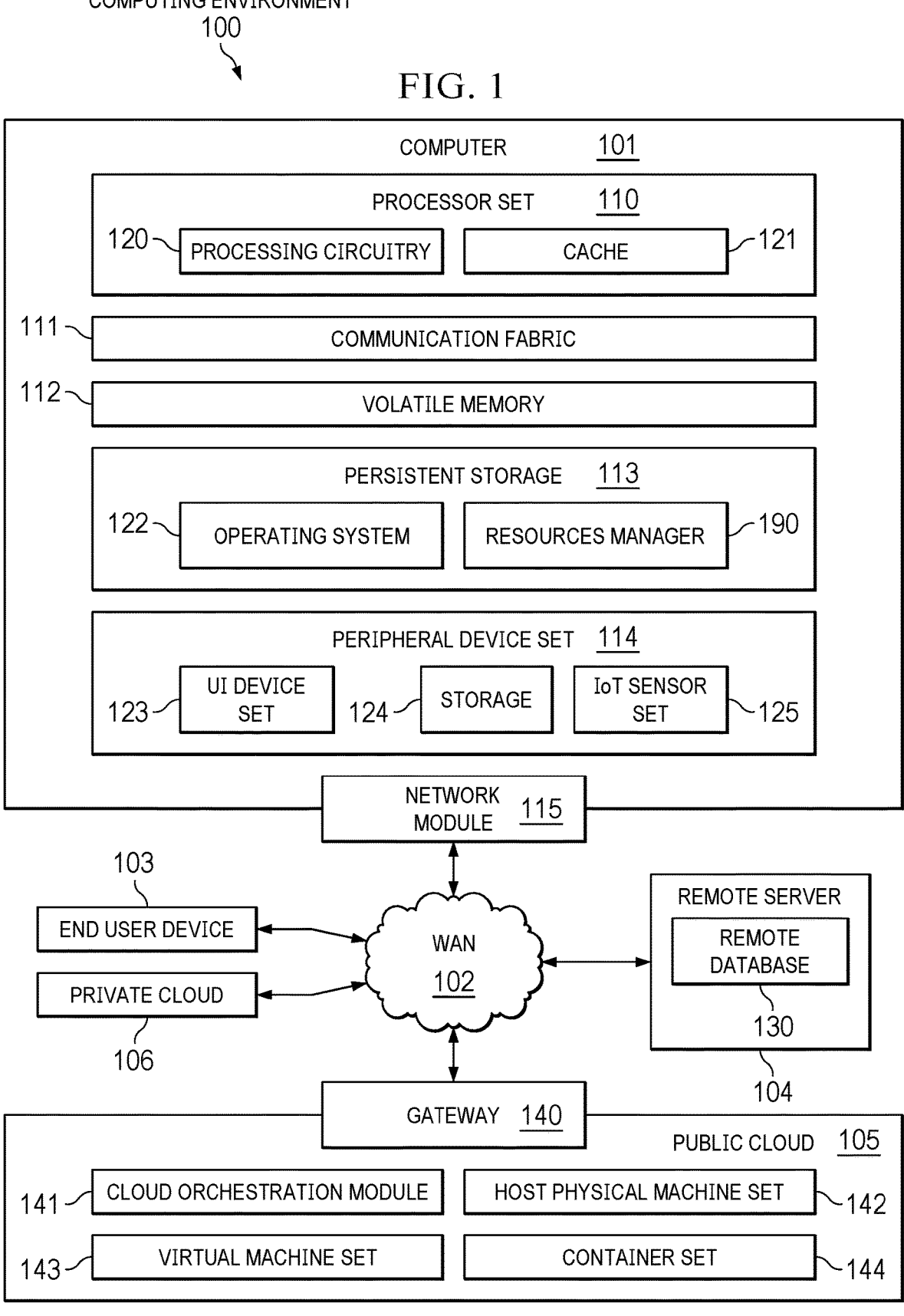
FIG. 1 is a block diagram of a computing environment in accordance with an illustrative embodiment.

According to one illustrative embodiment, a computer implemented method for selecting applications for processing requests is provided. A number of processor units identifies a number of applications as candidate applications for processing requests based on types of application programming interfaces for each application in the number of applications. The number of processor units validates metadata related to status of applications for each application in the number of candidate applications. The number of processor units selects a subgroup of applications from the number of applications as applications to process requests based on the validated metadata. As a result, the illustrative embodiments provide a technical effect of selecting applications as alternative sources for processing requests based on types of Application Programming Interfaces exposed to the applications such that workload on principal database can be reduced.

In the illustrative embodiments, the number of processor units further generates a ranked list of applications for processing requests based on the subgroup of applications. The subgroup of applications are ranked based on number of correctly processed requests for each application in the subgroup of applications. As a result, the illustrative embodiments provide a technical effect of prioritizing applications that have increased performance on processing requests.

In the illustrative embodiments, as part of generating a ranked list of applications for processing requests based on the subgroup of applications, the ranked list of applications for processing requests is periodically updated based on number of correctly processed requests for each application in the subgroup of applications. As a result, the illustrative embodiments provide a technical effect of constantly using applications with increased performance for processing requests.

In the illustrative embodiments, as part of generating a ranked list of applications for processing requests based on the subgroup of applications, the number of processor units further receives a request to retrieve information. The number of processor units identify the top application from the ranked list of applications to retrieve information based on context of the request. The number of processor units return requested information using the identified application. As a result, the illustrative embodiments provide a technical effect of utilizing the application with better performance to process requests.

In the illustrative embodiments, the number of processor units further determines whether the top application from the ranked list of applications is responsive. The number of processor units selects the next application from the ranked list of applications for processing requests in response to a determination that the top application from the ranked list of applications is not responsive. As a result, the illustrative embodiments provide a technical effect of constantly utilizing responsive applications with better performance to process requests.

In the illustrative embodiments, the metadata related to status of applications for each application in the number of applications are received from current source of truth. As a result, the illustrative embodiments provide a technical effect of utilizing current source of truth as references to determine whether applications can be used as alternative sources for processing requests.

In the illustrative embodiments, as part of validating metadata related to status of applications for each application in the number of applications, the number of processor units sends a number of requests to an application in the number of applications. The number of processor units receives metadata related to the status of the application for each request from the number of requests in response to sending the number of requests. The number of processor units simultaneously sends the number of requests to a principal database that has data to process the number of requests. The number of processor units compares metadata related to the status of the application for each request from the number of requests to the data from the principal database. The number of processor units generates a confidence score for the application based on comparisons performed for each request from the number of requests. The number of processor units determines whether the application can be selected as an application to process requests based on the confidence score. As a result, the illustrative embodiments provide a technical effect of effectively determining whether candidate applications can be used as sources for processing requests by utilizing the data from the principal database as a reference to compare to the metadata returned by candidate applications upon receiving requests.

According to one illustrative embodiment, a computer system comprises a number of processor units. The number of processor units execute program instructions to identify a number of applications as candidate applications for processing requests based on types of Application Programming Interfaces for each application in the number of applications. The number of processor units execute program instructions to receive metadata related to status of applications for each application in the number of candidate applications. The number of processor units execute program instructions to validate metadata related to status of applications for each application in the number of applications. The number of processor units execute program instructions to select a subgroup of applications from the number of applications as applications to process requests based on the validated metadata. As a result, the illustrative embodiments provide a technical effect of selecting applications as alternative sources for processing requests based on types of application programming interfaces exposed to the applications such that workload on principal database can be reduced.

In the illustrative embodiments, the number of processor units can further execute program instructions to generate a ranked list of applications for processing requests based on the subgroup of applications. The subgroup of applications are ranked based on number of correctly processed requests for each application in the subgroup of applications. As a result, the illustrative embodiments provide a technical effect of prioritizing applications that have increased performance on processing requests.

In the illustrative embodiments, as part of generating a ranked list of applications for processing requests based on the subgroup of applications, the ranked list of applications for processing requests is periodically updated based on number of correctly processed requests for each application in the subgroup of applications. As a result, the illustrative embodiments provide a technical effect of constantly using applications with increased performance for processing requests.

In the illustrative embodiments, as part of generating a ranked list of applications for processing requests based on the subgroup of applications, the number of processor units can further execute program instructions to receive a request to retrieve information, the number of processor units can further execute program instructions to identify the top application from the ranked list of applications to retrieve information based on context of the request. The number of processor units can further execute program instructions to return requested information using the identified application. As a result, the illustrative embodiments provide a technical effect of utilizing the application with increased performance to process requests.

In the illustrative embodiments, the processor units can further determine whether the top application from the ranked list of applications is responsive. The processor units can further execute program instructions to select the next application from the ranked list of applications for processing requests in response to a determination that the top application from the ranked list of applications is not responsive. As a result, the illustrative embodiments provide a technical effect of constantly utilizing responsive applications with increased performance to process requests.

In the illustrative embodiments, the metadata related to status of applications for each application in the number of applications are received from current source of truth. As a result, the illustrative embodiments provide a technical effect of utilizing current source of truth as references to determine whether applications can be used as alternative sources for processing requests.

In the illustrative embodiments, as part of validating metadata related to status of applications for each application in the number of applications, the number of processor units can further execute program instructions to send a number of requests to an application in the number of applications. The number of processor units can further execute program instructions to receive metadata related to the status of the application for each request from the number of requests in response to sending the number of requests. The number of processor units can further execute program instructions to simultaneously send the number of requests to a principal database that has data to process the number of requests. The number of processor units can further execute program instructions to compare metadata related to the status of the application for each request from the number of requests to the data from the principal database. The number of processor units can further execute program instructions to generate a confidence score for the application based on comparisons performed for each request from the number of requests. The number of processor units can further execute program instructions to determine whether the application can be selected as an application to process requests based on the confidence score. As a result, the illustrative embodiments provide a technical effect of effectively determining whether candidate applications can be used as sources for processing requests by utilizing the data from the principal database as reference to compare to the metadata returned by candidate applications upon receiving requests.

According to one illustrative embodiment, a computer program product for selecting applications for processing requests is provided. The computer program product includes a computer readable storage medium having program instructions embodied therewith. The program instructions executable by a computer system to cause the computer system to identify a number of applications as candidate applications for processing requests based on types of application programming interfaces for each application in the number of candidate applications. The program instructions executable by the computer system to cause the computer system to validate metadata related to status of applications for each application in the number of applications. The program instructions executable by the computer system to cause the computer system to select a subgroup of applications from the number of applications as applications to process requests based on the validated metadata. As a result, the illustrative embodiments provide a technical effect of selecting applications as alternative sources for processing requests based on types of Application Programming Interfaces exposed to the applications such that workload on principal database can be reduced.

In the illustrative embodiments, the program instructions can be further executable by the computer system to further cause the computer system to generate a ranked list of applications for processing requests based on the subgroup of applications. The subgroup of applications are ranked based on number of correctly processed requests for each application in the subgroup of applications. As a result, the illustrative embodiments provide a technical effect of prioritizing applications that have increased performance on processing requests.

In the illustrative embodiments, as part of generating a ranked list of applications for processing requests based on the subgroup of applications, the ranked list of applications for processing requests is periodically updated based on number of correctly processed requests for each application in the subgroup of applications. As a result, the illustrative embodiments provide a technical effect of constantly using applications with increased performance for processing requests.

In the illustrative embodiments, as part of generating a ranked list of applications for processing requests based on the subgroup of applications, the program instructions can be further executable by the computer system to further cause the computer system to receive a request to retrieve information. The program instructions can be further executable by the computer system to further cause the computer system to identify the top application from the ranked list of applications to retrieve information based on context of the request. The program instructions can be further executable by the computer system to further cause the computer system to return requested information using the identified application. As a result, the illustrative embodiments provide a technical effect of utilizing the application with increased performance to process requests.

In the illustrative embodiments, the program instructions can be further executable by the computer system to further cause the computer system to determine whether the top application from the ranked list of applications is responsive. The program instructions can be further executable by the computer system to further cause the computer system to select the next application from the ranked list of applications for processing requests in response to a determination that the top application from the ranked list of applications is not responsive. As a result, the illustrative embodiments provide a technical effect of constantly utilizing responsive applications with increased performance to process requests.

In the illustrative embodiments, the metadata related to status of applications for each application in the number of applications are received from current source of truth. As a result, the illustrative embodiments provide a technical effect of utilizing current source of truth as references to determine whether applications can be used as alternative sources for processing requests.

In the illustrative embodiments, as part of validating metadata related to status of applications for each application in the number of applications, the program instructions can be further executable by the computer system to further cause the computer system to send a number of requests to an application in the number of applications. The program instructions can be further executable by the computer system to further cause the computer system to receive metadata related to the status of the application for each request from the number of requests in response to sending the number of requests. The program instructions can be further executable by the computer system to further cause the computer system to simultaneously send the number of requests to a principal database that has data to process the number of requests. The program instructions can be further executable by the computer system to further cause the computer system to compare metadata related to the status of the application for each request from the number of requests to the data from the principal database. The program instructions can be further executable by the computer system to further cause the computer system to generate a confidence score for the application based on comparisons performed for each request from the number of requests. The program instructions can be further executable by the computer system to further cause the computer system to determine whether the application can be selected as an application to process requests based on the confidence score. As a result, the illustrative embodiments provide a technical effect of effectively determining whether candidate applications can be used as sources for processing requests by utilizing the data from the principal database as a reference to compare to the metadata returned by candidate applications upon receiving requests.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored. With reference now to the figures, in particular with reference to FIG. 1, a block diagram of a computing environment is depicted in accordance with an illustrative embodiment. Computing environment 100 contains an example of an environment for the execution of at least some of the computer code involved in performing the inventive methods, such as resources manager 190. In this example, resources manager 190 can operate to manage at least one of the creation or optimization of machine learning models. In the different illustrative examples, resources manager 190 can operate to apply regression models into an optimization process for data driven model optimization.

In addition to resources manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and resources manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in resources manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in resources manager 190 includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, the illustrative embodiments recognize and take into account that currently the principal database is the only authoritative source for processing requests in a container orchestration environment. In other words, overloading the principal database with a huge number of requests can cause backlog and consequently reduce efficiency of the computer system.

Additionally, the illustrative embodiments recognize and take into account that the applications running in the system can potentially serve as alternative sources for processing requests.

The illustrative embodiments also recognize and take into account that using applications as alternative sources for processing requests can reduce the workload on the principal database. The illustrative examples provide a computer implemented method, apparatus, computer system, and computer program product for selecting applications for processing requests such that workload on the principal database can be reduced to improve efficiency.

In an illustrative example, candidate applications for processing requests are identified based on the application programming interfaces exposed to these candidate applications. Metadata related to the status of applications for each application is validated by comparing data received in response to sending requests to each candidate application and principal database. The candidate applications that are validated can be used as alternative sources for processing requests.

In another illustrative example, a ranked list can be generated for candidate applications selected for processing requests. The applications are ranked based on number of correctly processed requests for each application in the subgroup of applications.

In yet another illustrative example, whether the top application from the ranked list is responsive can be determined. In this case, if the top application from the ranked list of applications is not responsive, the next application from the ranked list can be selected for processing requests.

Figure 2:
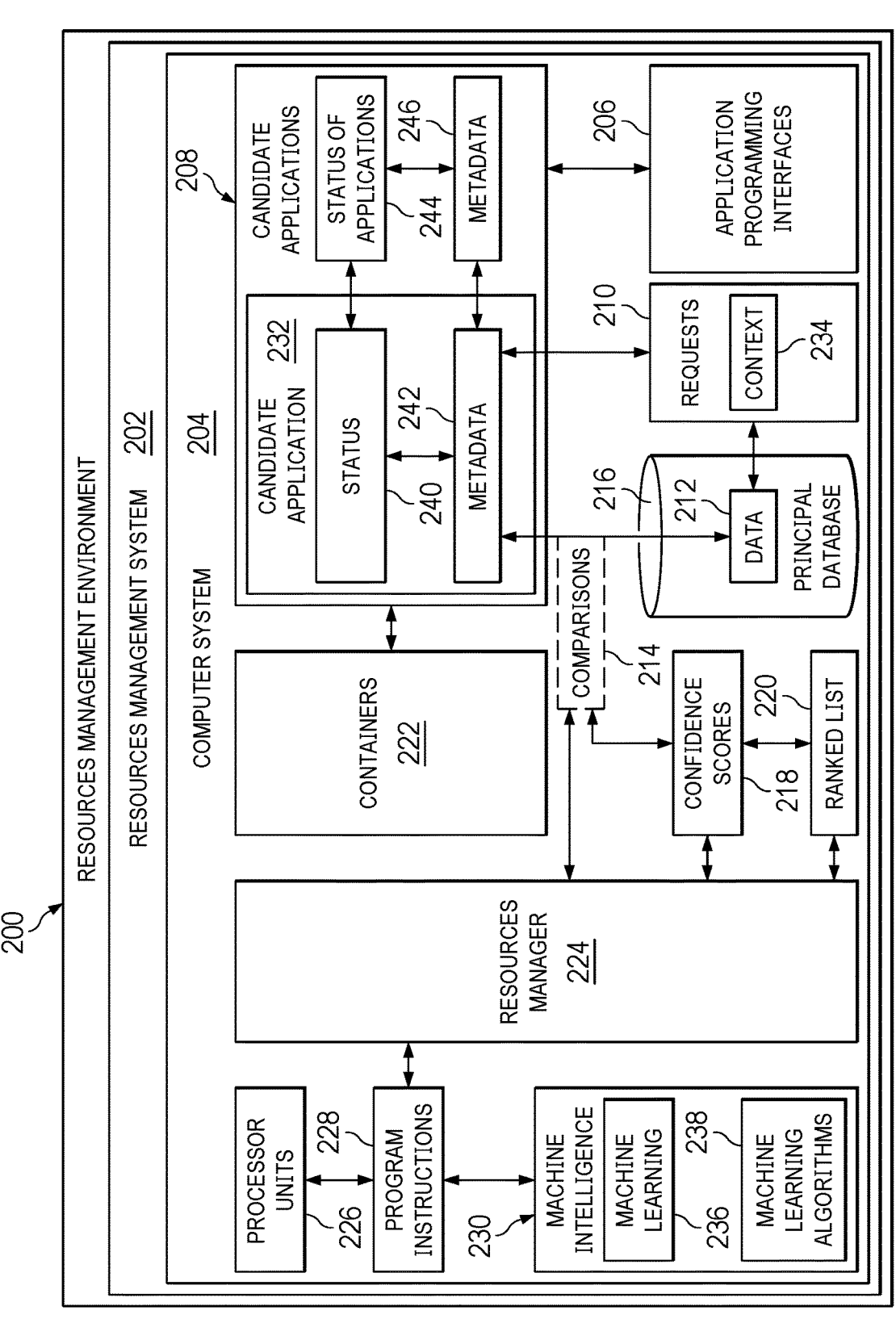
FIG. 2 is a block diagram of a resources management environment in accordance with an illustrative embodiment.

With reference now to FIG. 2, a block diagram of a resources management environment is depicted in accordance with an illustrative embodiment. In this illustrative example, resources management environment 200 includes components that can be implemented in computing environment 100 in FIG. 1.

In this illustrative example, resources management system 202 in resources management environment 200 can be used to select applications from candidate applications 208 for processing requests 210. This selection of applications can be used to manage at least one of a process or a system.

Resources management system 202 comprises a number of different components. As depicted, resources management system 202 comprises computer system 204 and resources manager 224. Resources manager 224 is located in computer system 204.

Resources manager 224 can be implemented in software, hardware, firmware, or a combination thereof. When software is used, the operations performed by resources manager 224 can be implemented in program instructions configured to run on hardware, such as a processor unit. When firmware is used, the operations performed by resources manager 224 can be implemented in program instructions and data and stored in persistent memory to run on a processor unit. When hardware is employed, the hardware can include circuits that operate to perform the operations in resources manager 224.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes a number of processor units 226 that are capable of executing program instructions 228 implementing processes in the illustrative examples. In other words, program instructions 228 are computer readable program instructions.

As used herein, a processor unit in the number of processor units 226 is a hardware device and is comprised of hardware circuits such as those on an integrated circuit that respond to and process instructions and program instructions that operate a computer. A processor unit can be implemented using processor set 110 in FIG. 1. When the number of processor units 226 executes program instructions 228 for a process, the number of processor units 226 can be one or more processor units that are in the same computer or in different computers. In other words, the process can be distributed between processor units 226 on the same or different computers in computer system 204.

Further, the number of processor units 226 can be of the same type or different type of processor units. For example, the number of processor units 226 can be selected from at least one of a single core processor, a dual-core processor, a multi-processor core, a general-purpose central processing unit (CPU), a graphics processing unit (GPU), a digital signal processor (DSP), or some other type of processor unit.

Computer system 204 further includes machine intelligence 230. Machine intelligence 230 comprises machine learning 236 and machine learning algorithms 238. Machine learning 236 is a branch of artificial intelligence (AI) that enables computers to detect patterns and improve performance without direct programming commands. Rather than relying on direct input commands to complete a task, machine learning 236 relies on input-data. The data is fed into the machine, one of machine learning algorithms 238 is selected, parameters for the data are configured, and the machine is instructed to find patterns in the input data through optimization algorithms. The data model formed from analyzing the data is then used to predict future values. In this illustrative example, the learning of the resources manager 224 can be achieved through a database input that is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching for the resources manager 224.

Machine intelligence 230 can be implemented using one or more systems such as an artificial intelligence system, a neural network, a Bayesian network, an expert system, a fuzzy logic system, a genetic algorithm, or other suitable types of systems. Machine learning 236 and machine learning algorithms 238 may make computer system 204 a special purpose computer for dynamic predictive modelling for processing data records.

Machine learning 236 involves using machine learning algorithms 238 to build machine learning models based on samples of data. The samples of data used for training referred to as training data or training datasets. Machine learning models can be trained using training datasets and make predictions without being explicitly programmed to make these predictions. Machine learning models can be trained and retrained for a number of different types of applications. These applications include, for example, medicine, healthcare, speech recognition, computer vision, or other types of applications. In this example, the outputs from machine learning model can be used to retrain the machine learning algorithms 238 to make predictions and forecasts with increased accuracy.

Machine learning algorithms 238 can include supervised machine learning algorithms and unsupervised machine learning algorithms. Supervised machine learning can train machine learning models using data containing both the inputs and desired outputs. Examples of machine learning algorithms include XGBoost, K-means clustering, and random forest.

In this illustrative example, resources manager 224 selects applications from candidate applications 208 to process requests 210. Candidate application 232 is one application in candidate applications 208. In this example, requests 210 are program instructions to perform various tasks and functions for computer system 204. Requests 210 can come from users, applications, other devices, or any entity that is able to communicate with computer system 204. Requests 210 further include context 234 that provides information associated with purpose and conditions for requests 210. For example, context 234 can include user identity, session information, request type, header, parameters, time, date, and any details for requests 210. In this illustrative example, context 234 can also include request type for requests 210. Request type can be types of requests that are related to functions of APIs. For example, request type for requests 210 can indicate that requests 210 are requests related to storage API that stores candidate applications 208. In another example, request type for requests 210 can indicate that requests 210 are requests for telemetry data that can be obtained from telemetry applications for remote monitoring in candidate applications 208.

Candidate applications 208 are exposed to a number of application programming interfaces (API) 206. Application programming interfaces 206 are rules, protocols, and tools that allow different applications to communicate and interact with each other. Application programming interfaces 206 can define the methods and data structure used to build software components and therefore provide insights on functionality and capabilities for applications that are exposed to application programming interfaces 206. In this illustrative example, candidate applications 208 can be identified by analyzing the types of application programming interfaces that are exposed to candidate applications 208. In this illustrative example, types of APIs can be associated to functionalities for APIs. For example, types of APIs can be web APIs, library APIs, operating system APIs, database APIs, and any types of APIs that are designed to interact with a component within a computer system.

As depicted, candidate applications 208 includes candidate application 232 that can be selected for processing requests. Candidate application 232 includes status 240 and metadata 242 that are associated with status 240. Status 240 provides information regarding the state and condition for candidate application 232. For example, status 240 can include operational status, health status, maintenance status, deployment status, availability, performance, or any information related to candidate application 232. In this illustrative example, status 240 and status information for other candidate applications in candidate applications 208 form status of applications 244.

Metadata 242 are descriptive data that provide context and detail associated with status 240 for candidate application 232. In this illustrative example, metadata 242 can be data that is used for responding to requests from requests 210. Metadata related to the status of an application provides additional information that helps to understand state, health, and behavior for the application. For example, metadata 242 can include label and annotations, traffic statistics, logs, response time, memory usage, and any information related to operation for candidate application 232. In this illustrative example, metadata 242 and metadata for other candidate applications in candidate applications 208 form metadata 246.

In this illustrative example, candidate applications 208 can be run in containers 222. Containers 222 are standalone software packages that contain everything needed to run candidate applications 208. For example, containers 222 can include application code, runtime, system tools, libraries, and settings for candidate applications 208. In this illustrative example, containers 222 can be run in a container platform or an orchestration environment such as Kubernetes environment. The orchestration environment automates the deployment, scaling, and management of containerized applications for containers 222 and candidate applications 208.

It should be appreciated that while the illustrative embodiments will be described herein with reference to a Kubernetes environment as an example container orchestration environment with which the mechanisms of the illustrative embodiments are utilized, the illustrative embodiments are not limited to such. To the contrary, the illustrative embodiments may be implemented and operate with any currently known or later developed container orchestration environments without departing from the spirit and scope of the present invention. For example, the illustrative embodiments can also be implemented in Docker Swarm, Nomad, Rancher, Marathon, or any other suitable container orchestration environments.

Computer system 204 further includes principal database 216. Principal database 216 is the database that stores critical data and therefore serves as an authoritative source of information, or source of truth. For example, in Kubernetes environment, etcd is a key value database that is responsible for storing and managing configuration data, metadata, and other important information for the Kubernetes environment. Principal database 216 can be used as a main source for processing requests from requests 210. In this illustrative example, principal database 216 can use data 212 for responding to requests from requests 210.

In this illustrative example, resources manager 224 validates metadata 246 related to status of applications 244 for each candidate application in candidate applications 208. As a result, resources manager 224 can select applications from candidate applications 208 for processing requests from requests 210 such that the workload on principal database 216 can be reduced.

Resources manager 224 validates a candidate application for processing requests by comparing data received from the candidate application to data received from principal database 216 upon receiving requests from requests 210.

For example, resources manager 224 validates candidate application 232 by simultaneously sending a request from requests 210 to candidate application 232 and principal database 216. In this for example, candidate application uses metadata 242 for responding the request from requests 210 and principal database 216 uses data 212 for responding to the request from requests 210. Resources manager 224 compares metadata 242 and data 212 to generate a comparison for comparisons 214.

In this illustrative example, comparisons in comparisons 214 can be used to generate scores for confidence scores 218. Confidence scores 218 indicates likelihoods for candidate applications to be selected for processing requests. Confidence scores 218 can be calculated based on the number of correctly processed requests. In other words, the confidence score for a candidate application is higher when more exact matches can be identified from comparisons 214 for the candidate application.

In this example, a threshold can be used to determine whether a candidate application from candidate application

232 can be used for processing requests. For example, a candidate application from candidate application 232 can be used for processing requests when the confidence score for the candidate application exceeds the threshold. In this illustrative example, confidence scores 218 is used to generate ranked list 220. Ranked list 220 includes information associated with candidate applications that can be used for processing requests.

In this illustrative example, applications in ranked list 220 can be ranked based on confidence scores 218. As a result, applications with higher confidence scores are ranked higher than applications with lower confidence scores in ranked list 220. In this illustrative example, ranked list 220 can be periodically updated as applications in ranked list 220 are processing more requests from requests 210. In other words, applications that correctly processed more requests are ranked higher in the list. In this illustrative example, applications that are ranked higher in the list will be prioritized for processing requests when new requests are received.

In this illustrative example, resources manager 224 can divert an incoming request from requests 210 to applications that can be found in ranked list 220. For example, when a request from requests 210 is sent to principal database 216, resources manager 224 can intercept the sent request and determine whether any application in ranked list 220 can also process the sent request based on context of the sent request. In this illustrative example, resources manager 224 will go through ranked list 220 from top to bottom to select an application. In other words, applications that are ranked higher are more likely to be selected for processing the sent request.

In this illustrative example, resources manager 224 can also monitor applications in ranked list 220 such that status associated with applications in ranked list 220 are always up to date. For example, resources manager 224 can determine whether applications in ranked list 220 are responsive to incoming requests. In this example, resources manager 224 can remove applications from ranked list 220 if certain applications in the ranked list 220 are unresponsive.

In one illustrative example, one or more solutions are present that overcome a problem with generating an optimization solution for managing computer components for processing requests. As a result, one or more solutions provide an effect of increasing efficiency of the principal database by diverting a portion of requests that can be processed by other applications.

Computer system 204 can be configured to perform at least one of the steps, operations, or actions described in the different illustrative examples using software, hardware, firmware, or a combination thereof. As a result, computer system 204 operates as a special purpose computer system in which resources manager 224 in computer system 204 enables application selection and resources management to reduce the workload on principal database 216. In particular, resources manager 224 transforms computer system 204 into a special purpose computer system as compared to currently available general computer systems that do not have resources manager 224.

The illustration of resources management environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
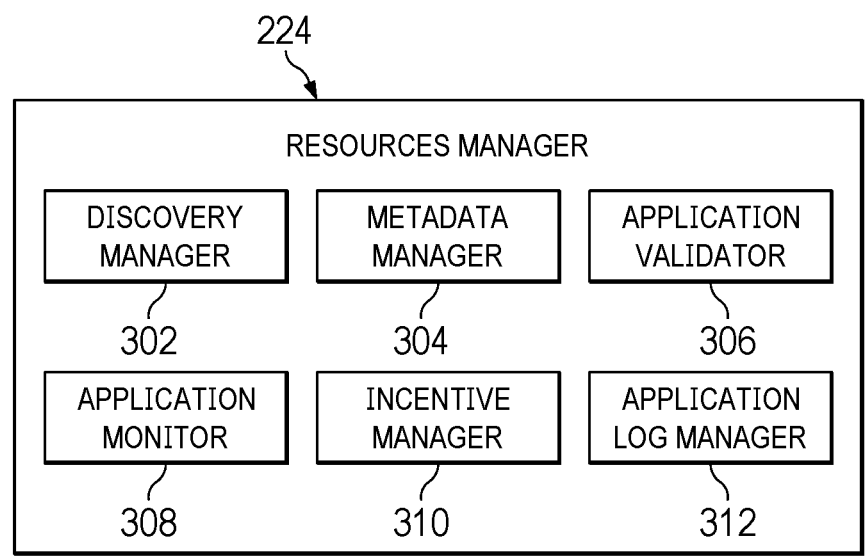
FIG. 3 is a block diagram of a resources manager in accordance with an illustrative embodiment.

With reference now to FIG. 3, a block diagram of resources manager is depicted in accordance with an illustrative embodiment. In this illustrative example, resources manager 224 includes a number of components to perform functions depicted above. In this illustrative example, the same reference numeral may be used in more than one figure. This reuse of a reference numeral in different figures represents the same element in the different figures.

As depicted, resources manager 224 includes discovery manager 302 to identify candidate applications for validation in a container orchestration environment such as Kubernetes environment. For example, resources manager 224 can identify candidate applications from a pod that contains a number of containers for applications as well as applications from neighboring pods. A pod is the smallest execution unit in Kubernetes environment and can encapsulate one or more applications using containers. In this example, neighboring pods are pods that are running on the same node as the pod where the candidate applications are identified. A node in Kubernetes environment refers to a machine that forms part of the underlying infrastructure where containerized applications are deployed and run. In this illustrative example, pods on the same node share and communicate with each other using a local network. As a result, communications between pods within the same node are more efficient and faster than communications between pods on different nodes.

Resources manager 224 further includes metadata manager 304 for identifying metadata associated with identified candidate applications. In this illustrative example, resources manager 224 can use metadata manager 304 to identify metadata 242 in FIG. 2.

As depicted, resources manager 224 also includes application validator 306 for validating candidate applications by determining whether information returned by the candidate application is correct. In this illustrative example, resources manager 224 can use application validator 306 to generate comparisons 214 for validating candidate application 232 in FIG. 2.

In this illustrative example, resources manager 224 includes application monitor 308 to monitor the status of applications selected for processing requests. As depicted in FIG. 2, resources manager 224 can use application monitor 308 to determine operation status for applications and subsequently delete unresponsive applications from ranked list 220.

Resources manager 224 further includes incentive manager 310 to rank applications selected for processing requests. As depicted, resources manager 224 can use incentive manager 310 to calculate confidence scores 218 for ranked list 220 in FIG. 2. In this illustrative example, incentive manager 310 periodically updates confidence scores for applications selected for processing requests and updates ranked list 220 accordingly.

Resources manager 224 also includes application log manager 312 to record information associated with applications selected for processing requests. For example, application log manager 312 can record information associated with processed requests, status, and any information related to selected applications.

It should also be understood that the illustration of resources manager 224 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

It should also be appreciated that while the illustrative embodiments will be described herein with reference to a Kubernetes environment as an example container orchestration environment with which the mechanisms of the illustrative embodiments are utilized, the illustrative embodiments are not limited to such. To the contrary, the illustrative embodiments may be implemented and operate with any currently known or later developed container orchestration environments without departing from the spirit and scope of the present invention. For example, the illustrative embodiments can also be implemented in Docker Swarm, Nomad, Rancher, Marathon, or any other suitable container orchestration environments.

Figure 4:
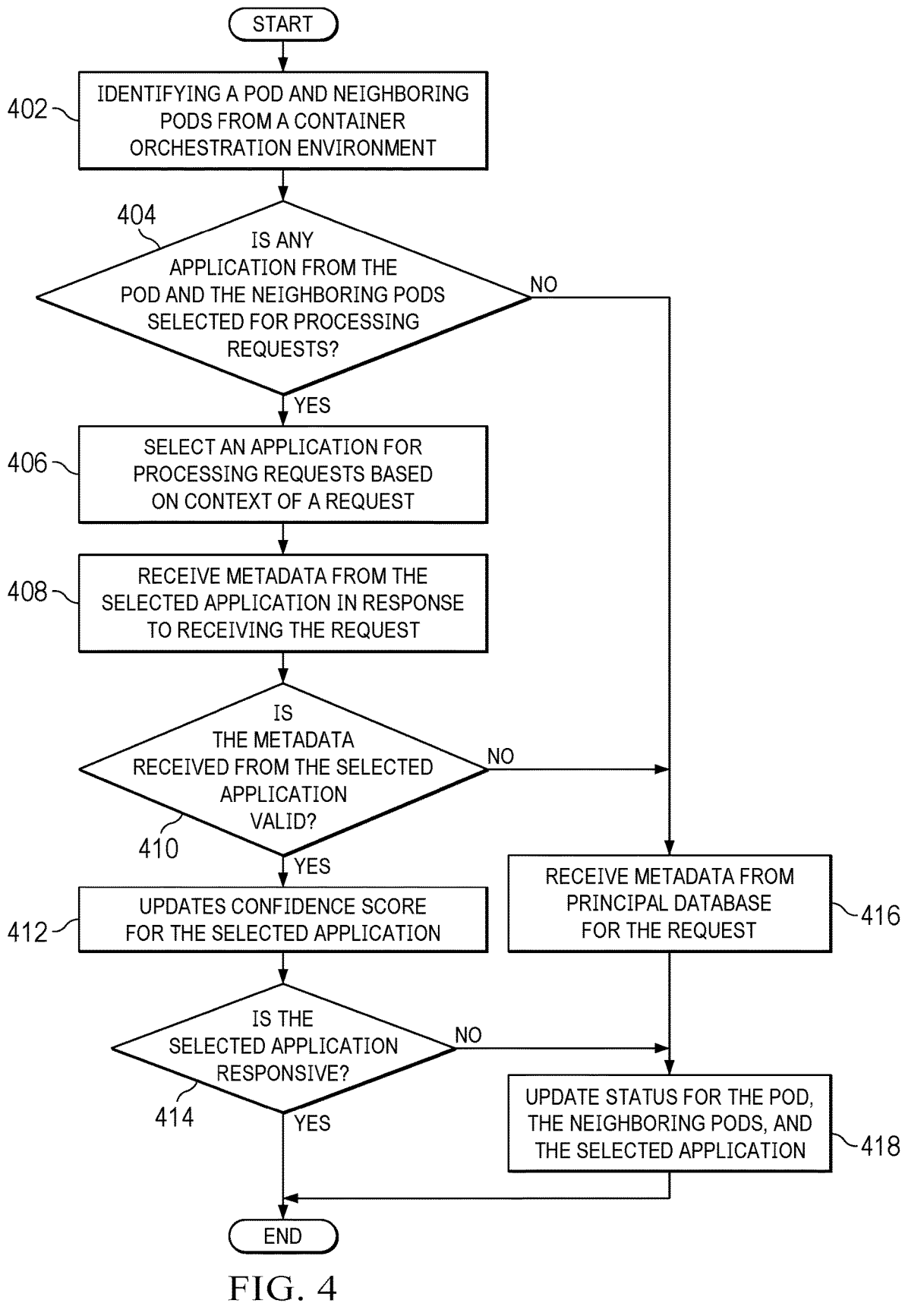
FIG. 4 is a flowchart for selecting an application to process a request in a container orchestration environment in accordance with an illustrative embodiment.

Turning now to FIG. 4, a flowchart for selecting an application to process a request in a container orchestration environment depicted in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process can be implemented in resources manager 224 in computer system 204 in FIG. 2.

The process begins by identifying a pod and neighboring pods from a container orchestration environment (step 402). As depicted, the container orchestration environment automates the deployment, scaling, and management of containerized applications. In this illustrative example, neighboring pods and the identified pod are running on the same node in the container orchestration environment such as Kubernetes environment. In this illustrative example, the process can identify neighboring pods by identifying all pods running on the same node as the identified pod.

The process determines whether any application from the pod and the neighboring pods are selected for processing requests (step 404). In step 404, an application from the pod and the neighboring pods are selected for processing requests when the application passed the validation process described in FIG. 2. In other words, an application from the pod and the neighboring pods is selected for processing requests when the application can respond with the same information as the principal database when a request is received by the application.

If any application from the pod and the neighboring pods has been selected for processing requests, the process selects an application for processing requests based on context of a request (step 406). In this step, the process can use ranked list 220 in FIG. 2 for selecting the application for processing the request. In this illustrative example, multiple applications can be first identified based on context of the request from ranked list 220 and the process can select the top ranked application from the identified application for processing the request.

The process receives metadata from the selected application in response to receiving the request (step 408). The process determines whether the metadata received from the selected application is valid (step 410). In this illustrative example, the process can determine the validity of the metadata from the selected application using the method described in FIG. 2. Responsive to a determination that the metadata received from the selected application is valid, the process updates confidence score for the selected application (step 412). In this step, the confidence score for the selected application can be used to determine the rank of the selected application on the list of applications depicted above.

The process determines whether the selected application is responsive (step 414). Responsive to a determination that the selected application is responsive, the process terminates thereafter.

With reference again to step 404, responsive to a determination that no application from the pod and the neighboring pods has been selected for processing requests, the process receives metadata from the principal database for the request (step 416).

With reference again to step 410, responsive to a determination that the metadata received from the selected application is not valid, the process also proceeds to step 416. The process updates the status for the pod, the neighboring pods, and the selected application (step 418). With reference again to step 414, responsive to a determination that the selected application is not responsive, the process also proceeds to step 418. In step 418, the status for the pod, the neighboring pods, and the selected application can be updated using resources manager 224 in FIG. 2 and FIG. 3. The process terminates thereafter.

It should be appreciated that while the illustrative embodiments will be described herein with reference to a Kubernetes environment as an example container orchestration environment with which the mechanisms of the illustrative embodiments are utilized, the illustrative embodiments are not limited to such. To the contrary, the illustrative embodiments may be implemented and operate with any currently known or later developed container orchestration environments without departing from the spirit and scope of the present invention. For example, the illustrative embodiments can also be implemented in Docker Swarm, Nomad, Rancher, Marathon, or any other suitable container orchestration environments.

Turning next to FIG. 5, a flowchart of a process for identifying applications for processing requests is depicted in accordance with an illustrative embodiment. The process in FIG. 5 can be implemented in hardware, software, or both. When implemented in software, the process can take the form of program instructions that are run by one or more processor units located in one or more hardware devices in one or more computer systems. For example, the process can be implemented in resources manager 224 in computer system 204 in FIG. 2.

The process begins by identifying a number of applications as candidate applications for processing requests based on types of Application Programming Interfaces for each application in the number of applications (step 502).

The process validates metadata related to status of applications for each application in the number of applications (step 504). The process selects a subgroup of applications from the number of applications as applications to process requests based on the validated metadata (step 506). The process terminates thereafter.

Figure 6:
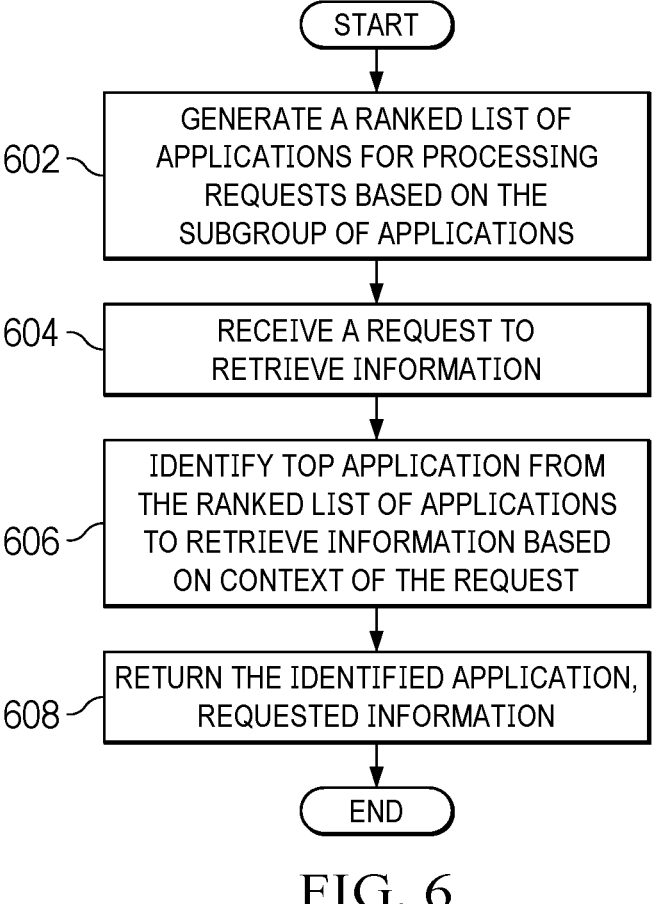
FIG. 6 is a flowchart of a process for selecting applications from a list for processing requests in accordance with an illustrative embodiment.

Turning next to FIG. 6, a flowchart of a process for selecting applications from a list for processing requests is depicted in accordance with an illustrative embodiment. The process illustrated in FIG. 6 is an example of an additional step that can be performed with the steps in FIG. 5.

The process begins by generating a ranked list of applications for processing requests based on the subgroup of applications (step 602). In step 602, the subgroup of applications is ranked based on number of correctly processed requests for each application in the subgroup of applications.

In other words, applications that correctly processed more requests are ranked higher in the list. In this illustrative example, applications that are ranked higher in the list will be prioritized for processing requests when new requests are received.

The process receives a request to retrieve information (step 604). The process identifies top application from the ranked list of applications to retrieve information based on context of the request (step 606). The process returns the requested information using the identified application (step 608). The process terminates thereafter.

Figure 7:
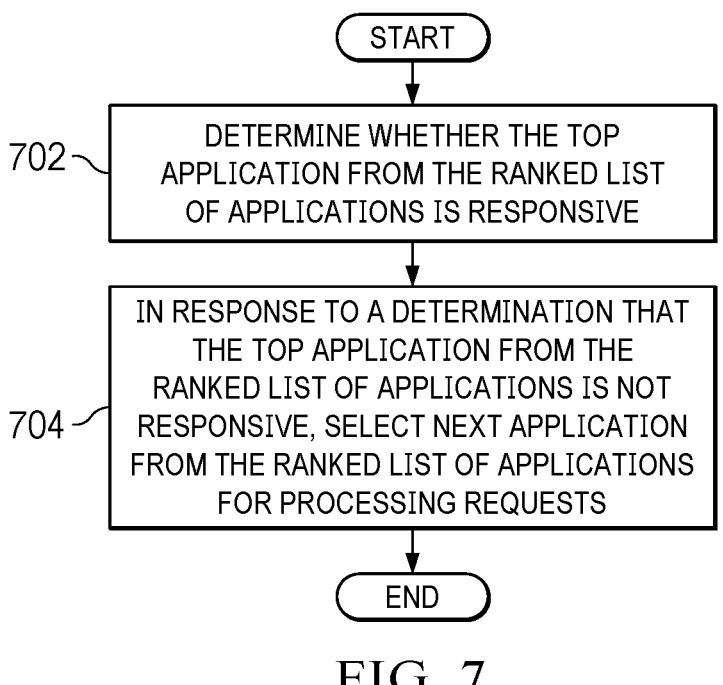
FIG. 7 is a flowchart of a process for selecting applications for processing requests in accordance with an illustrative embodiment.

Turning next to FIG. 7, a flowchart of a process for selecting applications for processing requests is depicted in accordance with an illustrative embodiment. The process illustrated in FIG. 7 is an example of steps that can be implemented in step 604 in FIG. 6.

The process begins by determining whether the top application from the ranked list of applications is responsive (step 702). The process selects the next application from the ranked list of applications for processing requests in response to a determination that the top application from the ranked list of applications is not responsive (step 704). The process terminates thereafter.

Turning next to FIG. 8, a flowchart of a process for validating applications for processing requests is depicted in accordance with an illustrative embodiment. The process illustrated in FIG. 8 is an example of steps that can be implemented in step 504 in FIG. 5.

The process begins by sending a number of requests to an application in the number of applications (step 802). The process receives metadata related to the status of the application for each request from the number of requests in response to sending the number of requests (step 804). In this step, the metadata related to the status of the application for each request can be received from the application in the number of applications.

The process concurrently sends the number of requests to a principal database that has data to process the number of requests (step 806). In step 806, the principal database is the database that serves as the primary source of data for the number of applications. In other words, the principal database is the central repository where essential data for the number of applications is stored and managed.

The process compares metadata related to the status of the application for each request from the number of requests to the data from the principal database (step 808). In step 808, the comparisons are performed to determine whether the metadata received from the applications is an exact match to the data from the principal database. In this illustrative example, the application may be used as an alternative source for processing requests if the metadata received from the applications is an exact match to the data from the principal database. By using the application as an alternative source for processing requests, traffic on the principal database can be reduced to improve performance.

The process generates a confidence score for the application based on comparisons performed for each request from the number of requests (step 810). In step 810, the confidence score for the application can be determined based on number of requests with metadata from the application that are matched with the data from the principal database. In other words, the confidence score for the application can be determined based on number of exact matches identified from the comparison performed in step 808.

The process determines whether the application can be selected as an application to process requests based on the confidence score (step 812). In step 812, a threshold can be used to determine whether the application can be selected as an alternative source to process requests for the principal database. In this illustrative example, the application can be selected as an alternative source to process requests if the confidence score for the application exceeds the threshold. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
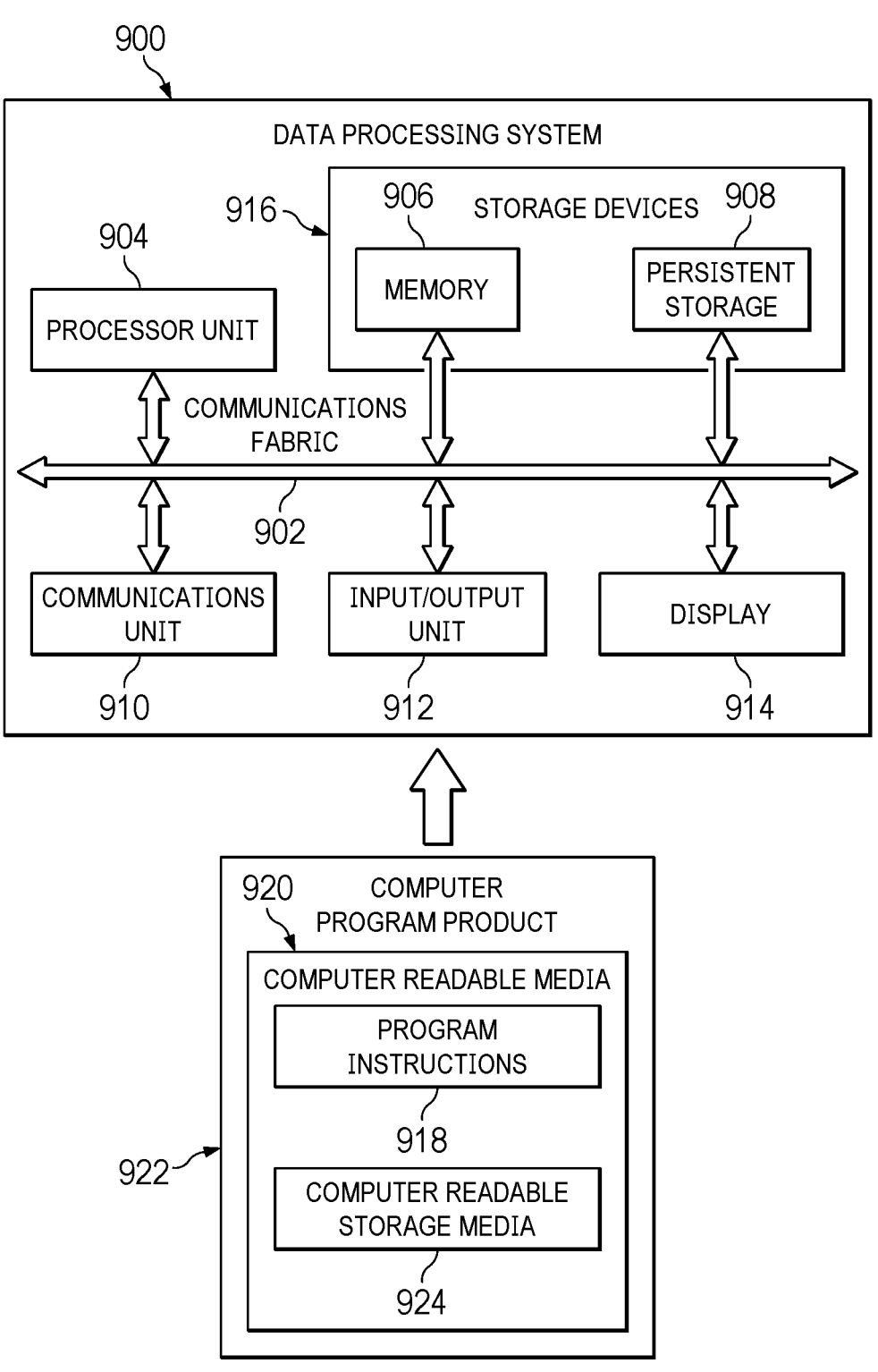
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement computers and computing devices in computing environment 100 in FIG. 1. Data processing system 900 can also be used to implement computer system 204 in FIG. 2. In this illustrative example, data processing system 900 includes communications framework 902, which provides communications between processor unit 904, memory 906, persistent storage 908, communications unit 910, input/output (I/O) unit 912 and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 916 may also be referred to as computer readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program instructions, computer usable program instructions, or computer readable program instructions that can be read and executed by a processor in processor unit 904. The program instructions in the different embodiments can be embodied on different physical or computer readable storage media, such as memory 906 or persistent storage 908.

Program instructions 918 are located in a functional form on computer readable media 920 that is selectively removable and can be loaded onto or transferred to data processing system 900 for execution by processor unit 904. Program instructions 918 and computer readable media 920 form computer program product 922 in these illustrative examples. In the illustrative example, computer readable media 920 is computer readable storage media 924.

Computer readable storage media 924 is a physical or tangible storage device used to store program instructions 918 rather than a medium that propagates or transmits program instructions 918. Computer readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 918 can be transferred to data processing system 900 using a computer readable signal media. The computer readable signal media are signals and can be, for example, a propagated data signal containing program instructions 918. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 920" can be singular or plural. For example, program instructions 918 can be located in computer readable media 920 in the form of a single storage device or system. In another example, program instructions 918 can be located in computer readable media 920 that is distributed in multiple data processing systems. In other words, some instructions in program instructions 918 can be located in one data processing system while other instructions in program instructions 918 can be located in another data processing system. For example, a portion of program instructions 918 can be located in computer readable media 920 in a server computer while another portion of program instructions 918 can be located in computer readable media 920 located in a set of client computers.

The different components illustrated for data processing system 900 are not meant to provide architectural limitations to the manner in which different embodiments can be implemented. In some illustrative examples, one or more of the components may be incorporated in, or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program instructions 918.

Thus, illustrative embodiments of the present invention provide a computer implemented method, computer system, and computer program product for selecting applications for processing requests. A number of processor units identify a number of candidate applications for processing requests based on types of application programming interface for each application. The number of processor units validate metadata related to status of applications for each application in the number of candidate applications. The number of processor units select a subgroup of applications from the number of candidate applications to process requests based on the validated metadata. Thus, with the ability to effectively select appropriate applications for processing requests, workload on the principal database can be reduced by diverting portions of incoming requests to selected applications such that efficiency for principal database can be improved.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method executed by a number of processing units, the computer implemented method comprising:
    sending a plurality of requests to each candidate application of a plurality of candidate applications;
    receiving, from each candidate application, metadata representing a status of each candidate application for processing each request in response to the sending;
    sending, concurrently with the receiving, the plurality of requests to a principal database, wherein:
        the principal database contains data to process the plurality of requests,
        a relationship exists between the metadata and the data contained in the principal database, and
        a confidence score for each candidate application is based on the relationship and each request received by the plurality of candidate applications; and
    processing, by a subgroup of candidate applications of the plurality of candidate applications, the plurality of requests based on the metadata, types of application programming interfaces for the plurality of candidate applications, and the confidence scores for the plurality of candidate applications.

2. The computer implemented method of claim 1, wherein a ranked list of the subgroup of candidate applications is based on a number of correctly processed requests for each candidate application in the subgroup of candidate applications.

3. The computer implemented method of claim 2, wherein an updated ranked list of the subgroup of candidate applications is based on the number of correctly processed requests for each candidate application in the subgroup of candidate applications.

4. The computer implemented method of claim 2, further comprising:
    receiving a request to retrieve information, wherein a top candidate application from the ranked list of the subgroup of candidate applications ranked from top to bottom retrieves the information based on context of the request; and
    returning, using the top candidate application, the information.

5. The computer implemented method of claim 4, wherein a next candidate application from the ranked list of the subgroup of candidate applications ranked from the top to the bottom processes the requests in response to the top candidate application being non-responsive.

6. The computer implemented method of claim 1, wherein the metadata is received from a current source of truth.

7. A computer system comprising:

a number of processor units, wherein the number of processor units executes program instructions to:

send a plurality of requests to each candidate application of a plurality of candidate applications;

receive, from each candidate application, metadata representing a status of each candidate application for processing each request in response to the sending;

send, concurrently with the receiving, the plurality of requests to a principal database, wherein:

the principal database contains data to process the plurality of requests, a relationship exists between the metadata and the data contained in the principal database, and a confidence score for each candidate application is based on the relationship and each request received by the plurality of candidate applications; and process, by a subgroup of candidate applications of the plurality of candidate applications, the plurality of requests based on the metadata, types of application programming interfaces for the plurality of candidate applications, and the confidence scores for the plurality of candidate applications.

8. The computer system of claim 7, wherein a ranked list of the subgroup of candidate applications is based on a number of correctly processed requests for each candidate application in the subgroup of candidate applications.

9. The computer system of claim 8, wherein an updated ranked list of the subgroup of candidate applications is based on the number of correctly processed requests for each candidate application in the subgroup of candidate applications.

10. The computer system of claim 8, wherein the number of processor units further executes program instructions to:

receive a request to retrieve information, wherein a top candidate application from the ranked list of the subgroup of candidate applications ranked from top to bottom retrieves the information based on context of the request; and return, using the top candidate application, the information.

11. The computer system of claim 10, wherein a next candidate application from the ranked list of the subgroup of candidate applications ranked from the top to the bottom processes the requests in response to the top candidate application being non-responsive.

12. The computer system of claim 7, wherein the metadata is received from a current source of truth.

13. A computer program product, the computer program product comprising a computer readable storage medium having program instructions embodied therewith, the program instructions executable by a computer system to cause the computer system to:

send a plurality of requests to each candidate application of a plurality of candidate applications;

receive, from each candidate application, metadata representing a status of each candidate application for processing each request in response to the sending;

send, concurrently with the receiving, the plurality of requests to a principal database, wherein:

the principal database contains data to process the plurality of requests, a relationship exists between the metadata and the data contained in the principal database, and a confidence score for each candidate application is based on the relationship and each request received by the plurality of candidate applications; and process, by a subgroup of candidate applications of the plurality of candidate applications, the plurality of requests based on the metadata, types of application programming interfaces for the plurality of candidate applications, and the confidence scores for the plurality of candidate applications.

14. The computer program product of claim 13, wherein a ranked list of the subgroup of candidate applications is based on a number of correctly processed requests for each candidate application in the subgroup of candidate applications.

15. The computer program product of claim 14, wherein an updated ranked list of the subgroup of candidate applications is based on the number of correctly processed requests for each candidate application in the subgroup of candidate applications.

16. The computer program product of claim 14, wherein the program instructions executable by the computer system further cause the computer system to:

receive a request to retrieve information, wherein a top candidate application from the ranked list of the subgroup of candidate applications ranked from top to bottom retrieves the information based on context of the request; and return, using the top candidate application, the information.

17. The computer program product of claim 16, wherein a next candidate application from the ranked list of the subgroup of candidate applications ranked from the top to the bottom processes the requests in response to the top candidate application being non-responsive.

18. The computer program product of claim 13, wherein the metadata is received from a current source of truth.

\* \* \* \* \*